United States Patent [19]

Layer

[11] Patent Number: 4,838,403

[45] Date of Patent: Jun. 13, 1989

[54] OVERTRAVEL STOP ACTIVATED CONTROL VALVE

[75] Inventor: John C. Layer, Caledonia, Ill.

[73] Assignee: Sundstrand Corp, Rockford, Ill.

[21] Appl. No.: 199,461

[22] Filed: May 27, 1988

[51] Int. Cl.$^4$ .................................................. F16D 11/04
[52] U.S. Cl. ........................................ 192/141; 192/139
[58] Field of Search ................ 192/139, 141, 138, 143

[56] References Cited

U.S. PATENT DOCUMENTS

| | | | |
|---|---|---|---|
| 2,810,262 | 10/1957 | Higley et al. | 60/97 |
| 3,361,240 | 1/1968 | Cagle | 192/141 |
| 3,501,114 | 3/1970 | DePlante | 244/46 |
| 3,590,965 | 7/1971 | Oppenheimer | 192/3 |
| 3,616,884 | 11/1971 | Jurge | 192/141 |
| 3,647,038 | 3/1972 | Balz | 192/141 |
| 4,023,430 | 5/1977 | Imamura | 74/412 TA |
| 4,179,944 | 12/1979 | Conner | 192/141 X |
| 4,180,187 | 12/1979 | Ben-Haim | 192/141 X |
| 4,241,814 | 12/1980 | Masclet | 188/266 |
| 4,641,737 | 2/1987 | Gillingham et al. | 192/141 |
| 4,721,196 | 1/1988 | Layer et al. | 192/139 X |
| 4,760,989 | 8/1988 | Elliot et al. | 192/141 X |

*Primary Examiner*—James T. McCall
*Attorney, Agent, or Firm*—Antonelli, Terry & Wands

[57] ABSTRACT

An overtravel stop for a rotary shaft (12) is disclosed having first and second embodiments. In the first embodiment, braking torque for the shaft is supplied by the restriction by valve (14) of at least hydraulic fluid flowing in low pressure hydraulic fluid return line (18) from a hydraulic motor (22) which is connected to the shaft by a drive unit (24) in response to movement of a movable stop (34, 36) to a travel limit along an axial travel path to stop the hydraulic motor. In the second embodiment, braking torque for the shaft is supplied by a combination of a mechanical stop produced by the interaction of stop jaws (82, 84) which are respectively carried by an axially movable annular member (32) and a fixed stop (86) and the restriction of at least the low pressure hydraulic return fluid line (18) by a valve (14). The second embodiment achieves precise final positioning of the shaft by using the mechanical stop to establish the final shaft position and permits the load bearing capacity of the mechanical stops to be downsized as a consequence of substantial braking torque being applied by the hydraulic motor.

29 Claims, 2 Drawing Sheets

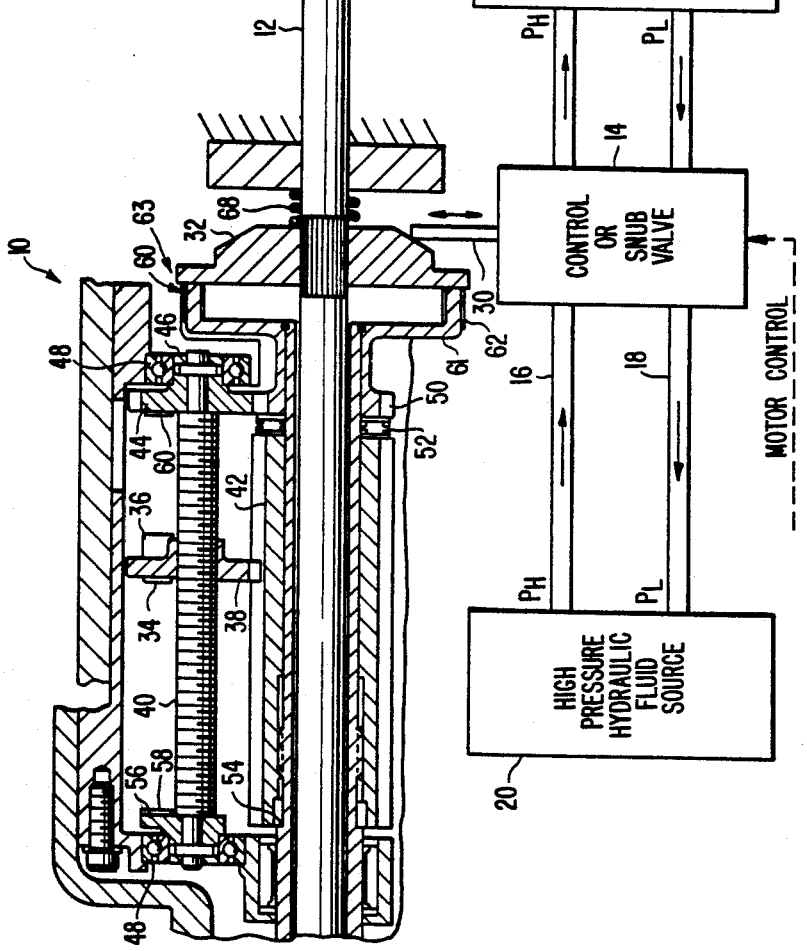
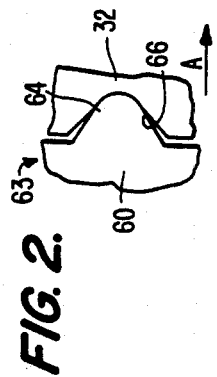

OVERTRAVEL STOP ACTIVATED CONTROL VALVE

TECHNICAL FIELD

The present invention relates to overtravel stops for rotating shafts for stopping the rotating shaft at a predetermined rotary position with respect to a reference position. More specifically, the present invention relates to overtravel stops of the aforementioned type which are useful for aircraft applications.

BACKGROUND ART

Rotational overtravel stops are often crucial components of actuators used in environments where not only cost but also reliability, weight, size and simplicity are important. For example, in applications where rotating actuators are used to adjust the flaps of an airplane wing, the reliability of the overtravel stops is crucial in order to prevent possible structural damage and also to prevent the flaps from being adjusted to an aerodynamically unstable position consequent from a failure in the primary control for the actuator. Simplicity and size are also important factors in ensuring the reliability of overtravel stops.

U.S. Pat. Nos. 4,641,737 and 4,721,196 are exemplary of prior art overtravel stops for rotating shafts. The '737 patent applies braking torque to the rotating shaft exclusively by means of the interaction between movable stops and the fixed stops. As a consequence, in applications where substantial braking torque is required, it is necessary that the stops have high torsional load bearing capability in order to provide the necessary braking torque. The '196 patent discloses an overtravel stop for a rotary shaft in which braking torque is applied by the interaction of a movable stop member and a fixed stopped member which has a torsional shock absorber coupled between the fixed stop and ground for transmitting torque from the fixed stop to ground. This design permits the use of the overtravel stop on a high speed shaft of high rigidity while reducing the stopping torque from that which would be present without the shock absorber.

Additionally, overtravel stops for rotary shafts are known in which torsion bars couple the fixed stop to ground to absorb the torque applied to the fixed stop by the rotating stop.

The prior art overtravel stops for rotating shafts having torsion bars or rubber torsional shock absorbers have space and temperature limitations. In high temperature applications rubber will seriously degrade over a period of time and becomes more elastic which limits its torsional load bearing capability. Similarly, torsion bars vary in their spring rate as a function of temperature. Both torsion bars and rubber torsional shock absorbers require an axial space between the fixed stop and ground which can be undesirable in applications where size limitations exist.

Snub valves are hydraulic valves which proportionately control the flow of hydraulic fluid as a function of the position of a valve control member.

Hydraulic control valves also are known which change from an open or closed steady state to the opposite steady state in response to movement of a control member past a reference position. These valves have no intermediate steady state.

DISCLOSURE OF INVENTION

The present invention provides an overtravel stop for a rotary shaft which is useful in applications involving high temperatures, requiring reduced size and braking of substantial rotational inertia without high load bearing fixed and movable stops. In a first embodiment of the invention, the totality of the braking torque is applied by the closing of one of the high pressure supply or return line to a hydraulic motor driving the shaft in response to an axially movable member being translated to an axial travel limit. In a second embodiment of the invention, braking torque is applied to the shaft by a combination of a movable and fixed stop and the closing of one of the high pressure supply or return line to the hydraulic motor in response to movement of an axially movable member being translated to an axial travel limit. This embodiment of the invention permits more precise positioning of the shaft after braking is complete as a consequence of the final rotational position of the shaft being determined by the fixed stop. Furthermore, stress on the hydraulic motor is reduced as a consequence of braking torque being split between the stops and the hydraulic motor.

Both embodiments of the invention have the advantage that a single valve used for controlling the speed and/or power may also be utilized for the blocking of one of the high pressure supply or the return line of the hydraulic motor which provides a simplified control. The valve may be a snub valve or control valve which changes from an open state to a closed state in response to movement of a control past a reference position. Furthermore, the valve may be actuated by a simple cam surface which does not require additional axial depth utilized by the prior art torsional or rubber shock absorbing mounts.

An overtravel stop for a rotary shaft in accordance with the first embodiment of the present invention includes a movable member which rotates with the shaft within an axial travel path along the shaft between a pair of travel limits; a hydraulic motor having a drive shaft for rotatably driving the shaft; a source of pressurized hydraulic fluid in fluid connection with the hydraulic motor for causing the hydraulic motor to rotate when pressurized hydraulic fluid is coupled thereto; a valve disposed in fluid connection at least between one of a high pressure supply port of the source of pressurized hydraulic fluid and a high pressure port of the hydraulic motor or a low pressure discharge port of the hydraulic motor and a low pressure return port of the source of pressurized hydraulic fluid, the valve having a control movable between a first position which permits hydraulic fluid to flow between the high pressure ports of the source of pressurized hydraulic fluid and the hydraulic motor and the low pressure discharge port and the low pressure return port and a second position which blocks the flow of hydraulic fluid between at least one of the high pressure ports of the source of pressurized hydraulic fluid and the hydraulic motor and the low pressure port of the hydraulic motor and the low pressure return port; and a controller, associated with the movable member and the control valve, for causing the control of the valve to move to the second position when the movable member reaches a travel limit to cause the shaft to have a braking torque applied thereto by the hydraulic motor to stop the shaft. Preferably, the valve is also disposed between both of the high pressure supply port of the hydraulic motor and a high pressure supply port of the source of pressurized hydraulic fluid and the return port of the source of pressurized hydraulic fluid and the low pressure port of the hydraulic motor, the valve permitting pressurized hydraulic fluid to flow from the high pressure supply port of the source of pressurized hydraulic fluid to the high pressure supply port of the hydraulic motor and hydraulic fluid to flow from the low pressure port of the hydraulic motor to the return port of the source of pressurized hydraulic fluid when the control is in the first position and blocking flow of pressurized hydraulic fluid from the high pressure supply port of the source of pressurized hydraulic fluid to the high pressure supply port of the hydraulic motor and the flow of hydraulic fluid from the low pressure port of the hydraulic motor to the low pressure return port of the source of pressurized hydraulic fluid when the control valve is in the second position. The controller for causing the movable member to engage the control of the valve includes a threaded shaft having a first gear connected thereto with a fixed angular position with respect to the threaded shaft and a second gear having a threaded bore which engages threads of the shaft and which is axially movable to a travel limit where the second gear applies torque to the first gear; a drive gear connected to a rotary shaft at a fixed angular position and having teeth engaging the second gear for applying torque from the rotary shaft to the threaded shaft when the second gear engages a stop attached to the threaded shaft; a gear having teeth engaging the teeth of the first gear and connected to an annular ring having a cam; and an annular cam follower biased against the cam, the annular cam follower engaging the control of the valve when the cam rotates relative to the cam follower.

An overtravel stop for a rotary shaft in accordance with the second embodiment of the present invention includes an axially fixed stop having at least one stop jaw; a movable stop which rotates with the shaft within an axial travel path along the shaft between a pair of travel limits and having at least one stop jaw; a mechanism for causing the at least one stop jaw of the movable stop to engage the at least one fixed stop jaw of the fixed stop when the movable stop has reached one of the axial travel limits to stop the shaft, the at least one stop jaw of the movable and fixed stops upon engagement applying a first braking torque to the shaft; a hydraulic motor having a drive shaft for rotatably driving the shaft; a source of pressurized hydraulic fluid in fluid connection with the hydraulic motor for causing the hydraulic motor to rotate when pressurized hydraulic fluid is coupled thereto; a valve disposed in fluid connection at least between one of a high pressure supply port of the source of pressurized hydraulic fluid and a high pressure port of the hydraulic motor or a low pressure discharge port of the hydraulic motor and a low pressure return port of the source of pressurized hydraulic fluid, the valve having a control movable between a first position which permits hydraulic fluid to flow between the high pressure ports of the source of pressurized hydraulic fluid and the hydraulic motor and the low pressure discharge port and the low pressure return port and a second position which blocks the flow of hydraulic fluid between at least one of the high pressure ports of the source of pressurized hydraulic fluid and the hydraulic motor and the low pressure port of the hydraulic motor and the low pressure return port; and a controller, associated with the movable stop and the control of the valve, for causing the control of the valve to move to the second position when the movable stop reaches a travel limit to cause the shaft to have a second braking torque applied thereto by the hydraulic motor. Preferably, the second braking torque is larger than the first braking torque and may be, while not limited thereto, approximately 95% of the total braking torque applied to the shaft with the braking torque applied by the stop jaws of the fixed and movable stops establishing the final position of the shaft. The valve may also be disposed between both of the high pressure supply port of the hydraulic motor and a high pressure supply port of the source of pressurized hydraulic fluid and the return port of the source of pressurized hydraulic fluid and the low pressure port of the hydraulic motor, the valve permitting pressurized hydraulic fluid to flow from the high pressure supply port of the source of pressurized hydraulic fluid to the high pressure supply port of the hydraulic motor and hydraulic fluid to flow from the low pressure port of the hydraulic motor to the return port of the source of pressurized hydraulic fluid when the control is in the first position and blocking the flow of pressurized hydraulic fluid from the high pressure supply port of the source of pressurized hydraulic fluid to the high pressure supply port of the hydraulic motor and the flow of hydraulic fluid from the low pressure port of the hydraulic motor to the low pressure return port of the source of pressurized hydraulic fluid when the control is in the second position. The mechanism for causing the at least one stop jaw of the movable stop to engage the at least one stop jaw of the fixed stop includes a threaded shaft having a first gear connected thereto with a fixed angular position with respect to the threaded shaft and a second gear having a threaded bore which engages threads of the shaft and which is axially movable to a travel limit where the second gear applies torque to the first gear; a drive gear connected to a rotary shaft at a fixed angular position and having teeth engaging teeth of the second gear for applying torque from the rotary shaft to the threaded shaft when the second gear engages a stop attached to the threaded shaft; a gear having teeth engaging teeth of the first gear and connected to an annular ring having a cam; and an annular cam follower biased against the cam, the annular cam follower engaging the control of the valve when the cam rotates relative to the cam follower.

BRIEF DESCRIPTION OF THE DRAWINGS

FIG. 1 illustrates a first embodiment of the present invention.

FIG. 2 illustrates the cam and cam follower of FIG. 1 which activates the control of the valve.

BEST MODE FOR CARRYING OUT THE INVENTION

Figure 3:
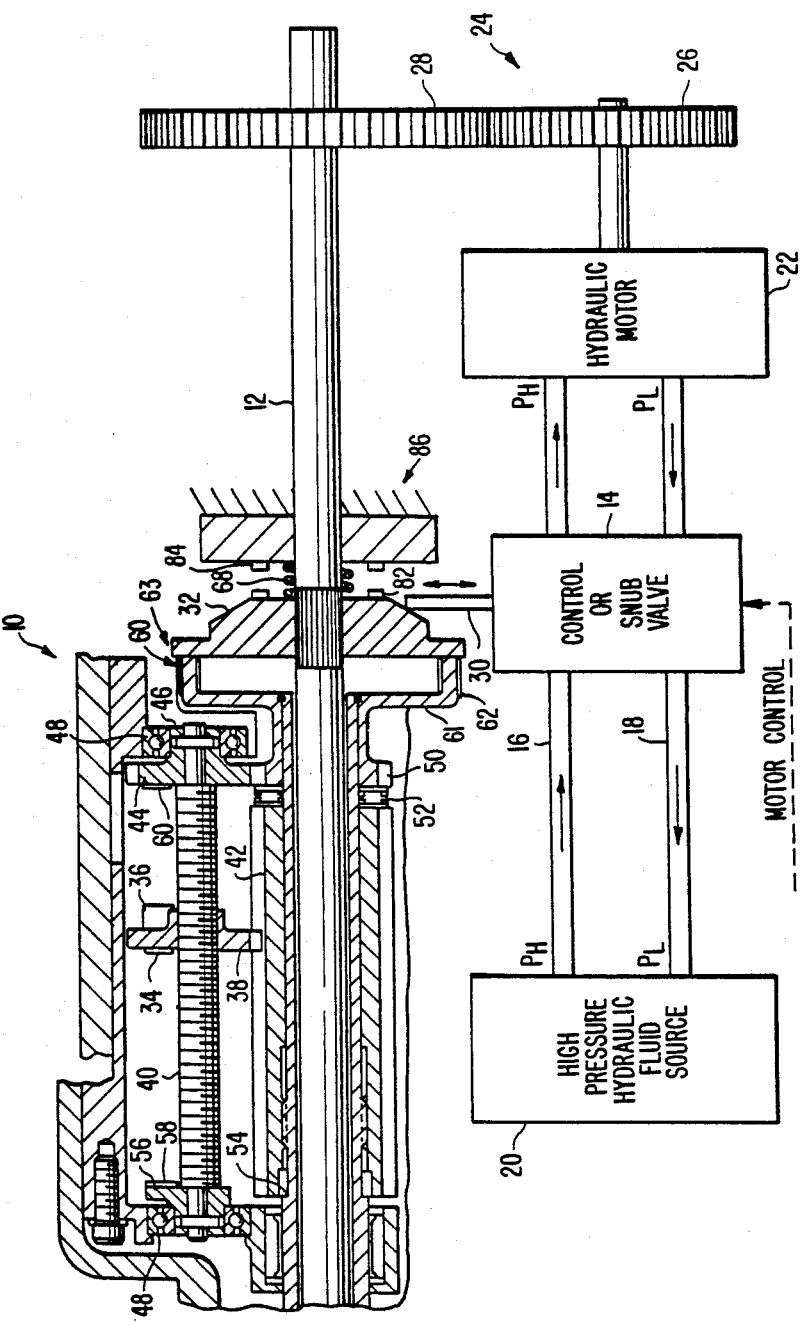
FIG. 3 illustrates a second embodiment of the present invention.

FIG. 1 illustrates a first embodiment 10 of an overtravel stop for a rotary shaft in accordance with the present invention. The first embodiment of the present invention functions to apply a braking torque to a rotatably mounted shaft 12 by activation of a control or snub valve 14 disposed within a high pressure hydraulic line 16 and a low pressure hydraulic return line 18 which are respectively coupled to a high pressure port $P_H$ of a high pressure hydraulic fluid source 20 and a high pressure port $P_H$ of hydraulic motor 22 and a low pressure return port $P_L$ of the high pressure hydraulic fluid source and a low pressure port $P_L$ of the hydraulic motor. The hydraulic motor 22 applies braking torque to the shaft 12 by a drive unit 24 consisting of a pair of meshing spur gears 26 and 28 by the blocking of at least the low pressure hydraulic line in response to the downward vertical movement of a control 30 of the valve 14. While in the preferred embodiment, the valve 14 is disposed in both the high pressure and low pressure hydraulic lines 16 and 18, it should be understood that the invention may be practiced with the valve disposed in either one of the high pressure hydraulic line 16 or the low pressure hydraulic line 18. The positioning of the valve 14 in both of the hydraulic lines 16 and 18 insures the most precise stopping position of the shaft 12 by preventing pressure perturbations from causing the shaft to move in the opposite direction upon closing of the valve. Placing of the valve 14 in only the low pressure hydraulic line 18 will produce rapid stopping of rotation of the shaft 12 in the direction of movement but does not prevent possible movement of the shaft in the reverse direction as a consequence of pressure perturbations caused by closing only the low pressure line. Placing of the valve 14 in only the high pressure hydraulic line 16 is effective in stopping rotation of the shaft but may be slower in producing a complete stop than when closing only the low pressure hydraulic line 18 because of possible cavitation of the hydraulic fluid which also may be undesirable from the standpoint of hydraulic motor operation. The control 30 is activated vertically downward by axial movement of an annular member 32, which is splined to shaft 12, to the right in response to stops 34 or 36 carried by gear 38 that threadably engages threaded shaft 40 impacting fixed stops 58 or 60 which are carried respectively by lefthand limiting stop 56 and limiting gear 46. The gear 38 is driven by a drive gear 42 which is keyed to shaft 12. A limiting gear 44 is connected to shaft 40 by means of pin 46. Lefthand limiting stop 56 is connected to threaded shaft 40 by pin 47. The shaft 40 is rotatably supported by bearings 48. Limiting gear 44 meshes with shift gear 50. A lock nut 52 secures the drive gear 42 against shaft shoulder 54. Although drive gear 42 may be formed unitarily with shaft 20, the above-described structure is preferable in that it allows the drive gear to be changed to change the number of rotations of the gear 38 which are necessary to traverse the gear between the lefthand and righthand travel limits of the travel path defined by the lefthand limiting stop 56 and the righthand limiting stop which is the limiting gear 44. The lefthand stop 58 carried by the lefthand limiting stop 56 intercepts the stop 34 carried by the gear 38 to lock the shaft 40 into rotation by torque applied from the shaft 12. Similarly, the stop 36 impacts the stop 60 carried by the gear 44 to lock up the shaft 40 with torque applied from the shaft 12 by means of drive from the drive gear 42.

As is described in detail in U.S. Pat. Nos. 4,641,737 and 4,721,196, a different gear ratio is provided between the gear 38 and the drive gear 42 and the limiting gear 44 and the shift gear 50 which causes the gear 38 to traverse along the travel path of the threaded shaft 40, between lefthand and righthand travel limits defined by the lefthand stop 56 and the limiting gear 44, in either a leftward or rightward direction depending upon the direction of rotation of the shaft 12 until one of the stops 34 or 36 intercepts one of the stops 58 and 60 to cause the limiting gear 44 to drive the shift gear 50.

The shift gear 50 is part of an annular member 60 which also includes a radial flange 61 and an annular ring 62. The annular member is rotatably mounted to shaft 12 so that during movement of gear 38 between the lefthand and righthand travel limits of the travel path there is no relative rotation of the annular member with respect to shaft 12. Due to the slightly different gear ratios between drive gear 42 and gear 38 and shift gear 50 and limiting gear 44, the gears 38 and 44 rotate at a slightly different rate relative to one another. Since the limiting gear 44 rotates with threaded shaft 40, the gear 38 rotates at a slightly different rate than the threaded shaft which causes the gear 38 to axially translate depending on the direction of rotation of the shaft 40 to the left or right along the threaded shaft between the lefthand travel limits of the travel path defined by the lefthand stop 56 and the gear 44. However, when the stops 34 or 36 of the gear 38 intercept the stops 58 or 60, gear 38 is held against further rotation and thus rotates at the same rate as the gear 44. As a result, gear 42 and shift gear 50 rotate at different rates which causes the shift gear to be rotatably shifted about drive shaft 12.

FIG. 2 illustrates a cam 63 which is disposed between opposed faces of the annular ring 62 and the axially movable annular member 32. Relative rotation of the shift gear 50 with respect to axially movable annular member 32 causes cam projection 64 to ride up the inclined surface 66 to cause movement of the axially movable annular member 32 in the direction indicated by the letter "A". The rightward movement of the axially movable annular member 32 causes the control 30 to be moved vertically downward to activate the valve 14 to change from fluid conducting to fluid blocking. A spring 68 is disposed between opposed faces of the axially movable annular member 32 and a fixed ground member 70. The spring causes the axially movable annular member to be biased to the left to cause the control 30 to be actuated only in response to relative movement of the cam projection 64 with respect to the inclined surface 66 in response to the gear 38 travelling to the lefthand travel limit of the axial travel path, which is all the way to the left in FIG. 1, or the gear travelling to the righthand travel limit of the axial travel path which is all the way to right in FIG. 1.

It should be noted that the valve 14 may be either a control valve having a state which changes from a fluid conducting state to a fluid blocking state when a control is moved past a reference position or a snub valve. In the prior art as described above, a snub valve functions to proportionately control the speed of a hydraulic motor as a function of the position of control 30 whereas a control valve may perform other functions including having bistable "on" and "off" states which are switched by the control 30 passing a reference position. The present invention may be practiced with either a control or snub valve being used to control the flow of hydraulic fluid through the high pressure hydraulic line 16 and the low pressure hydraulic line 18.

The first embodiment of the present invention operates as follows. Rotation of the gear 38 to either the lefthand travel limit or the righthand travel limit of the axial travel path causes the stationary stops 58 or 60 to engage the corresponding stops 34 or 36 carried by the gear 38 to lock up the gear 38 with the limiting gear 44. Locking of the gear 38 to the limiting gear 44 causes relative rotation of the shift gear 50 with respect to the axially shiftable annular member 32 which causes the cam projection 64 to ride up the inclined surface 66 to translate the axially movable annular member 32 to the right against the spring bias applied by spring 68 to move control 30 vertically downward to activate the valve 14. If the valve 14 is connected to only the low pressure hydraulic line 18, the return of hydraulic fluid from the low pressure port identified by "$P_L$" of the hydraulic motor 22 to the low pressure port identified by "$P_L$" of the high pressure hydraulic fluid source 20 is blocked. Because of the relative incompressibility of hydraulic fluid, the shaft of the hydraulic motor 22 is braked by a high braking torque. It should be noted that the hydraulic lines 16 and 18 have some degree of elasticity which functions to absorb at least some of the high shock load caused by the valve 14 rapidly blocking the return path of hydraulic fluid in the low pressure hydraulic line 18 if the valve has an "on"-"off" function as described above. If more precise control is required, the valve 14 may be a snub valve which proportionately closes off line 18 as the axially movable member 32 moves to the right. Furthermore, the valve 14 may also be disposed in the high pressure hydraulic line 16 to block the flow of pressurized hydraulic fluid from the high pressure port "$P_H$" of the high pressure hydraulic fluid source 20 to the high pressure port "$P_H$" of the hydraulic motor 22 to prevent any pressure waves or perturbations from causing reverse torque to be applied to the motor. Moreover, as described above, the valve 14 may be disposed in only the high pressure hydraulic line 16. Because of the relative lack of backlash in the drive unit 24, the locking up of the hydraulic unit 22 causes high braking torque to be applied to the shaft 12 to cause it to be stopped quickly. This embodiment has the advantage of not having any mechanical stops which are required in the prior art. It should be noted that the slope of the face of the axially movable annular member 32 which engages the control 30 to cause vertical movement of the control may be varied to control the proportionate shut off of hydraulic fluid in the high pressure hydraulic line 16 and the low pressure hydraulic line 18 if a snub valve function is utilized in valve 14. In the alternative, if an "on"-"off" control valve function is utilized, there is no proportional control once the control 30 moves to the second position which may be a predetermined point on the slope of the cam face of the axially movable annular member 30 with the first position being a point where there is no contact between the control and the face of the cam.

FIG. 3 illustrates a second embodiment of the present invention. Like reference numerals identify like parts in FIGS. 1 and 3. Only those parts which differ in FIG. 3 from FIG. 1 will be discussed. The fundamental difference in operation between the first embodiment illustrated in FIG. 1 and the second embodiment illustrated in FIG. 3 is that part of the stopping torque applied to the rotatably mounted shaft 12 is provided by stop jaws 82 and 84 which are respectively mounted on the axially movable annular member 32 which functions as a movable stop and on a fixed stop 86 which is connected to ground. It should be understood that the stop jaws 82 and 84 may be any design which is capable of applying braking torque to the shaft 12 by means of a splined connection between the axially movable annular member 32 and the shaft. Preferably, the majority of braking torque is applied to the shaft 12 by means of locking up the rotor of the hydraulic motor by the action of the valve 14 as described above with a minority of the stopping torque being applied by the interaction of the aforementioned stop jaws 82 and 84. While not limited thereto, the overall percentage of the torque that is applied to the shaft 12 by the hydraulic motor 22 having its rotor arrested by the action of the valve 14 may be 95% or more. The use of the stop jaws 82 and 84 ensures a precise final position of the shaft 12 which is more difficult to achieve by the action of the first embodiment which has not fixed mechanical stop. Additionally, positioning of the valve 14 in both of the high and low pressure lines 16 and 18, respectively, further enhances precise final positioning of the shaft 12 by preventing counter torques caused by pressure perturbations. Furthermore, the sharing of the braking torque between the hydraulic motor 22 and the stop jaws 82 and 84 permits the overall size of the stop jaws to be reduced from the prior art while at the same time preventing the full braking torque being applied by the hydraulic motor 22.

Three sequences of activation of the valve 14 as a function of the position of the axially movable annular member 32 are possible. In the first sequence, the control 30 is moved vertically downward sufficiently to activate the valve prior to engagement of the stop jaws 82 and 84 as illustrated in FIG. 3. Furthermore, as pointed out above, if the valve function is implemented with a snub valve function, the slope of the cam surface of the axially movable annular member 32 which causes the control 30 to be moved downward may be varied in slope to control the rate of axial movement necessary for moving the control 30 from a first position in which the flow of hydraulic fluid through the valve 14 is unrestricted to positions between the first position and the second position in which the flow is proportionally decreased as the control 30 moves from the first position to the second position and has a flow characteristic in which the fluid flow through the valve is blocked when the control is in the second position. When operated as a snub valve function, the second position in which the flow of fluid in at least the low pressure hydraulic line 18 is fully blocked by valve 14 would occur prior to engagement of the stop jaws 82 and 84. When the valve 14 is operated as a valve in which the valve function is either on or off, the control function would be switched from the flow characteristic in which fluid flow is unrestricted in at least one of the high pressure hydraulic line 16 or the low pressure hydraulic fluid return line 18 to a flow characteristic in which the fluid flow is completely blocked. The second sequence is that the valve 14 is fully shut off at the point of impact between the stop jaws 82 and 84. When the valve 14 is operated as a snub valve function, initiation of movement of the control 30 from the first position toward the second position would be initiated prior to impact of the stop jaws 82 and 84. When operated as a valve with an "on"-"off" function, the valve 14 would be switched from its first state "on" when fluid flow was unrestricted in the high pressure hydraulic fluid line 16 and the low pressure hydraulic fluid line 18 to the second "off" state in which fluid flow is at least fully blocked in one of the high pressure hydraulic line 16 or the low pressure hydraulic fluid line 18 at the point of impact of the stop jaws 82 and 84. The third possible sequence is that the valve 14 is fully shut off after the stop jaws 82 and 84 have impacted. When the valve 14 is operated as a snub valve function, initiation of movement of the control 30 from the first position toward the second position could be initiated either prior to the point of impact between the stop jaws 82 and 84 or after the point of impact between the stop jaws. When the valve 14 is operated as a valve with an "on"-"off" function, the valve would be switched from the first "on"

state in which the fluid flow characteristic is unrestricted in the high pressure hydraulic line 16 and the low pressure hydraulic line 18 to the second "off" state in which the flow characteristic is at least blocked in one of the high pressure hydraulic line 16 or the low pressure hydraulic line 18 after the point of impact between the stop jaws 82 and 84. The overall timing sequence of initiation of the control of the valve function as either an "on"-"off" function or a snub valve is a function of the dynamics of the system which is being stopped and the desired braking characteristic. The elasticity of the hydraulic lines must also be considered in order to choose the desired timing of initiation of the control function in order to achieve the desired overall braking characteristic of the shaft 12 when the lefthand or righthand limits of the axial travel path have been reached.

While the invention has been described in terms of its preferred embodiments, it should be understood that numerous modifications may be made thereto without departing from the spirit and scope of the invention. It is intended that all such modifications fall within the scope of the appended claims.

I claim:

1. An overtravel stop for a rotary shaft comprising:
   a fixed stop having at least one stop jaw;
   a movable stop which rotates with the shaft within an axial travel path along the shaft having a pair of travel limits and having at least one stop jaw;
   means for causing the at least one stop jaw of the movable stop to engage the at least one stop jaw of the fixed stop when the movable stop has reached one of the axial travel limits to stop the shaft;
   the at least one stop jaw of the movable and fixed stops upon engagement applying a first braking torque to the shaft;
   a hydraulic motor having a drive shaft for rotatably driving the shaft;
   a source of pressurized hydraulic fluid in fluid connection with the hydraulic motor for causing the hydraulic motor to rotate when pressurized hydraulic fluid is coupled thereto;
   a valve disposed in fluid connection at least between a low pressure discharge port of the hydraulic motor and a low pressure return port of the source of pressurized hydraulic fluid, the valve having a control movable between a first position which permits unrestricted flow of hydraulic fluid between a high pressure port of the source of pressurized hydraulic fluid and a high pressure port of the hydraulic motor and the low pressure discharge port and the low pressure return port and a second position which blocks at least the return of hydraulic fluid to the low pressure return port; and
   control means, associated with the movable stop and the control of the valve, for causing the control of the valve to move to the second position in response to the movable stop reaching one travel limit within the axial travel path to cause the shaft to have a second braking torque applied thereto by the hydraulic motor.

2. An overtravel stop in accordance with claim 1 wherein:
   the second braking torque is larger than the first braking torque.

3. An overtravel stop in accordance with claim 2 wherein:
   the second braking torque is approximately 95% of a total braking torque applied to the shaft.

4. An overtravel stop in accordance with claim 1 wherein:
   the control valve is disposed between both of the high pressure supply port of the hydraulic motor and a high pressure supply port of the source of pressurized hydraulic fluid and the low pressure port of the hydraulic motor and the low pressure return port of the source of pressurized hydraulic fluid, the control valve permitting pressurized hydraulic fluid to flow from the high pressure supply port of the source of pressurized hydraulic fluid to the high pressure supply port of the hydraulic motor and from the low pressure port of the hydraulic motor to the low pressure return port of the source of pressurized hydraulic fluid when the control is in the first position and blocking the flow of pressurized hydraulic fluid from the high pressure supply port of the source of pressurized hydraulic fluid to the high pressure supply port of the hydraulic motor and from the low pressure port of the hydraulic motor to the low pressure return port of the source of pressurized hydraulic fluid when the control is in the second position.

5. An overtravel stop in accordance with claim 4 wherein:
   the second braking torque is larger than the first braking torque.

6. An overtravel stop in accordance with claim 5 wherein:
   the second braking torque is approximately 95% of a total braking torque applied to the shaft.

7. An overtravel stop in accordance with claim 1 wherein:
   the valve has only steady state on and off flow conditions in which fluid flow through the valve in the on condition is unrestricted when the control is in the first position and in which fluid flow is blocked in the off condition when the control is in the second position.

8. An overtravel stop in accordance with claim 1 wherein:
   the valve is a snub valve which has a first flow characteristic in which fluid flow through the valve is unrestricted when the control is in the first position, fluid flow proportionately decreases as the control moves from the first position to the second position and has a flow characteristic in which fluid flow through the valve is blocked when the control is in the second position.

9. An overtravel stop in accordance with claim 2 wherein:
   the valve has only steady state on and off flow conditions in which fluid flow through the valve in the on condition is unrestricted when the control is in the first position and in which fluid flow is blocked in the off condition when the control is in the second position.

10. An overtravel stop in accordance with claim 2 wherein:
    the valve is a snub valve which has a first flow characteristic in which fluid flow through the valve in the on condition is unrestricted when the control is in the first position, fluid flow proportionately decreases as the control moves from the first position to the second position and has a flow characteristic in which fluid flow through the valve is blocked when the control is in the second position.

11. An overtravel stop in accordance with claim 4 wherein:
the valve has only steady state on and off flow conditions in which fluid flow through the valve in the on condition is unrestricted when the control is in the first position and in which fluid flow is blocked in the off condition when the control is in the second position.

12. An overtravel stop in accordance with claim 4 wherein:
the valve is a snub valve which has a first flow characteristic in which fluid flow through the valve is unrestricted when the control is in the first position, fluid flow proportionately decreases as the control moves from the first position to the second position and has a flow characteristic in which fluid flow through the valve is blocked when the control is in the second position.

13. An overtravel stop in accordance with claim 5 wherein:
the valve has only steady state on and off flow conditions in which fluid flow through the valve in the on condition is unrestricted when the control is in the first position and in which fluid flow is blocked in the off condition when the control is in the second position.

14. An overtravel stop in accordance with claim 5 wherein:
the valve is a snub valve which has a first flow characteristic in which fluid flow through the valve is unrestricted when the control is in the first position, fluid flow proportionately decreases as the control moves from the first position to the second position and has a flow characteristic in which fluid flow through the valve is blocked when the control is in the second position.

15. An overtravel stop in accordance with claim 1 wherein the means for causing the at least one stop jaw of the movable stop to engage the at least one fixed stop jaw of the fixed stop comprises:
a threaded shaft having a first gear connected thereto with a fixed angular position with respect to the threaded shaft and a second gear having a threaded bore which engages threads of the shaft and which is axially movable to the pair of axial limits where the second gear applies torque to the first gear;
a drive gear connected to the rotary shaft at a fixed angular position and having teeth engaging teeth of the second gear for applying torque from the rotary shaft to the threaded shaft when the second gear engages a stop attached to the threaded shaft;
a gear having teeth engaging teeth of the first gear and connected to an annular ring having a cam; and
an annular cam follower biased against the cam and splined to the shaft, engaging the control when the gear having teeth engaging teeth of the first gear rotates relative to the annular ring.

16. An overtravel stop for a rotary shaft comprising:
a movable member which rotates with the shaft within an axial travel path along the shaft having a pair of travel limits;
a hydraulic motor having a drive shaft for rotatably driving the shaft;
a source of pressurized hydraulic fluid in fluid connection with the hydraulic motor for causing the hydraulic motor to rotate when pressurized hydraulic fluid is coupled thereto;
a valve disposed in fluid connection at least between a low pressure discharge port of the hydraulic motor and a low pressure return port of the source of pressurized hydraulic fluid, the valve having a control movable between a first position which permits unrestricted flow of hydraulic fluid between a high pressure port of the source of pressurized hydraulic fluid and a high pressure port of the hydraulic motor and the low pressure discharge port and the low pressure return port and a second position which blocks at least the return of hydraulic fluid to the low pressure return port; and
control means, associated with the movable member and the control of the valve, for causing the control of the valve to move to the second position in response to the movable member reaching one of the travel limits to cause the shaft to have a braking torque applied thereto by the hydraulic motor to stop the shaft.

17. An overtravel stop in accordance with claim 16 wherein:
the valve is disposed between both of the high pressure supply port of the hydraulic motor and the high pressure supply port of the source of pressurized hydraulic fluid and the low pressure port of the hydraulic motor and the low pressure return port of the source of pressurized hydraulic fluid, the valve permitting pressurized hydraulic fluid to flow from the high pressure supply port of the source of pressurized hydraulic fluid to the high pressure supply port of the hydraulic motor and the low pressure port of the hydraulic motor and the low pressure return port of the source of pressurized hydraulic fluid when the control is in the first position and blocking the flow of pressurized hydraulic fluid from the high pressure supply port of the source of pressurized hydraulic fluid to the high pressure supply port of the hydraulic motor and from the low pressure port of the hydraulic motor and the low pressure return port of the source of pressurized hydraulic fluid when the control is in the second position.

18. An overtravel stop in accordance with claim 16 wherein:
the valve has only steady state on and off flow conditions in which fluid flow through the valve in the on condition is unrestricted when the control is in the first position and in which fluid flow is blocked in the off condition when the control is in the second position.

19. An overtravel stop in accordance with claim 16 wherein:
the valve is a snub valve which has a first flow characteristic in which fluid flow through the valve is unrestricted when the control is in the first position, fluid flow proportionately decreases as the control moves from the first position to the second position and has a flow characteristic in which fluid flow through the valve is blocked when the control is in the second position.

20. An overtravel stop in accordance with claim 17 wherein:
the valve has only steady state on and off flow conditions in which fluid flow through the valve in the on condition is unrestricted when the control is in the first position and in which fluid flow is blocked in the off condition when the control is in the second position.

21. An overtravel stop in accordance with claim 17 wherein:
the valve is a snub valve which has a first flow characteristic in which fluid flow through the valve is unrestricted when the control is in the first position, fluid flow proportionately decreases as the control moves from the first position to the second position and has a flow characteristic in which fluid flow through the valve is blocked when the control is in the second position.

22. An overtravel stop in accordance with claim 17 wherein the control means for causing the movable member to engage the control of the valve comprises:
a threaded shaft having a first gear connected thereto with a fixed angular position with respect to the threaded shaft and a second gear having a threaded bore which engages threads of the shaft and which is axially movable to the pair of axial limits where the second gear applies torque to the first gear;
a drive gear connected to the rotary shaft at a fixed angular position and having teeth engaging teeth of the second gear for applying torque from the rotary shaft to the threaded shaft when the second gear engages a stop attached to the threaded shaft;
a gear having teeth engaging teeth of the first gear and connected to an annular ring having a cam; and
an annular cam follower biased against the cam and splined to the shaft, engaging the control when the gear having teeth engaging teeth of the first gear rotates relative to the annular ring.

23. An overtravel stop for a rotary shaft in accordance with claim 1 wherein:
the control moves to the second position before the stop jaws of the fixed and movable jaws impact.

24. An overtravel stop for rotary shaft in accordance with claim 1 wherein:
the control moves to the second position at a point of impact of between the stop jaws of the fixed and movable stops.

25. An overtravel stop for a rotary shaft in accordance with claim 1 wherein:
the control moves to the second position after the stop jaws of the fixed and movable jaws impact.

26. An overtravel stop for a rotary shaft comprising:
a fixed stop having at least one stop jaw;
a movable stop which rotates with the shaft within an axial travel path along the shaft having a pair of travel limits and having at least one stop jaw;
means for causing the at least one stop jaw of the movable stop to engage the at least one stop jaw of the fixed stop when the movable stop has reached one of the axial travel limits to stop the shaft;
the at least one stop jaw of the movable and fixed stops upon engagement applying a first braking torque to the shaft;
a hydraulic motor having a drive shaft for rotatably driving the shaft;
a source of pressurized hydraulic fluid in fluid connection with the hydraulic motor for causing the hydraulic motor to rotate when pressurized hydraulic fluid is coupled thereto;
a valve disposed in fluid connection at least between a high pressure port of the hydraulic motor and a high pressure supply port of the source of pressurized hydraulic fluid, the valve having a control movable between a first position which permits unrestricted flow of hydraulic fluid between the high pressure port of the source of pressurized hydraulic fluid and the high pressure port of the hydraulic motor and a low pressure discharge port of the hydraulic motor and a low pressure return port of the source of pressurized hydraulic fluid and a second position which blocks at least the supply of pressurized hydraulic fluid from the high pressure port of the source of pressurized hydraulic fluid to the high pressure port of the hydraulic motor; and
control means, associated with the movable stop and the control of the valve, for causing the control of the valve to move to the second position in response to the movable stop reaching one travel limit within the axial travel path to cause the shaft to have a second braking torque applied thereto by the hydraulic motor.

27. An overtravel stop in accordance with claim 26 wherein:
the second braking torque is larger than the first braking torque.

28. An overtravel stop in accordance with claim 27 wherein:
the second braking torque is approximately 95% of a total braking torque applied to the shaft.

29. An overtravel stop for a rotary shaft comprising:
a movable member which rotates with the shaft within an axial travel path along the shaft having a pair of travel limits;
a hydraulic motor having a drive shaft for rotatably driving the shaft;
a source of pressurized hydraulic fluid in fluid connection with the hydraulic motor for causing the hydraulic motor to rotate when pressurized hydraulic fluid is coupled thereto;
a valve disposed in fluid connection at least between a high pressure port of the hydraulic motor and a high pressure supply port of the source of pressurized hydraulic fluid, the valve having a control movable between a first position which permits unrestricted flow of hydraulic fluid between the high pressure port of the source of pressurized hydraulic fluid and the high pressure port of the hydraulic motor and a low pressure discharge port of the hydraulic motor and a low pressure return port and a second position which blocks at least the supply of hydraulic fluid from the high pressure port of the source of pressurized hydraulic fluid to the high pressure port of the hydraulic motor;, and
control means, associated with the movable member and to the control of the valve, for causing the control of the valve to move to the second position in response to the movable member reaching one of the travel limits to cause the shaft to have a braking torque applied thereto by the hydraulic motor to stop the shaft.

* * * * *